May 19, 1953  G. E. MALLINCKRODT  2,638,880
ROTARY EXPANSION ENGINE
Filed Nov. 8, 1950  4 Sheets-Sheet 1

George E. Mallinckrodt,
Inventor.
Koenig and Pope,
Attorneys.

May 19, 1953 — G. E. MALLINCKRODT — 2,638,880
ROTARY EXPANSION ENGINE
Filed Nov. 8, 1950 — 4 Sheets-Sheet 2

George E. Mallinckrodt, Inventor.
Koenig and Pope, Attorneys.

May 19, 1953  G. E. MALLINCKRODT  2,638,880
ROTARY EXPANSION ENGINE
Filed Nov. 8, 1950  4 Sheets-Sheet 3
FIG. 7.
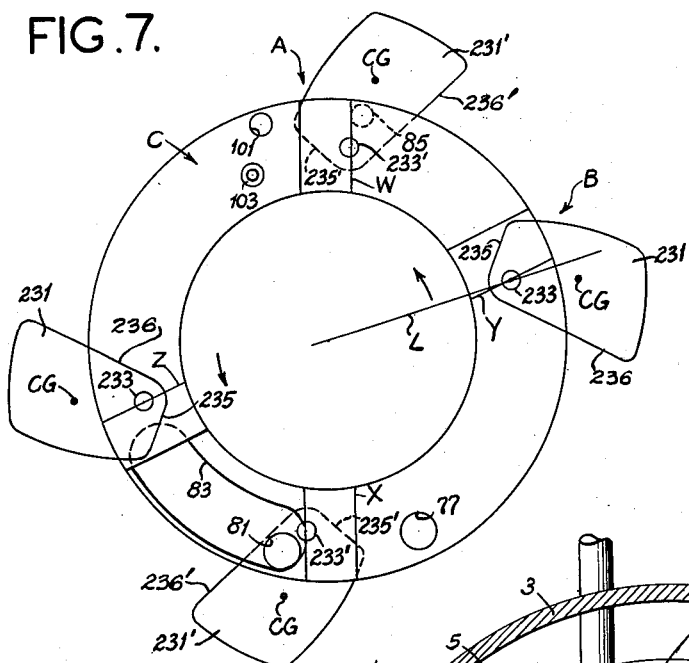
FIG. 10.
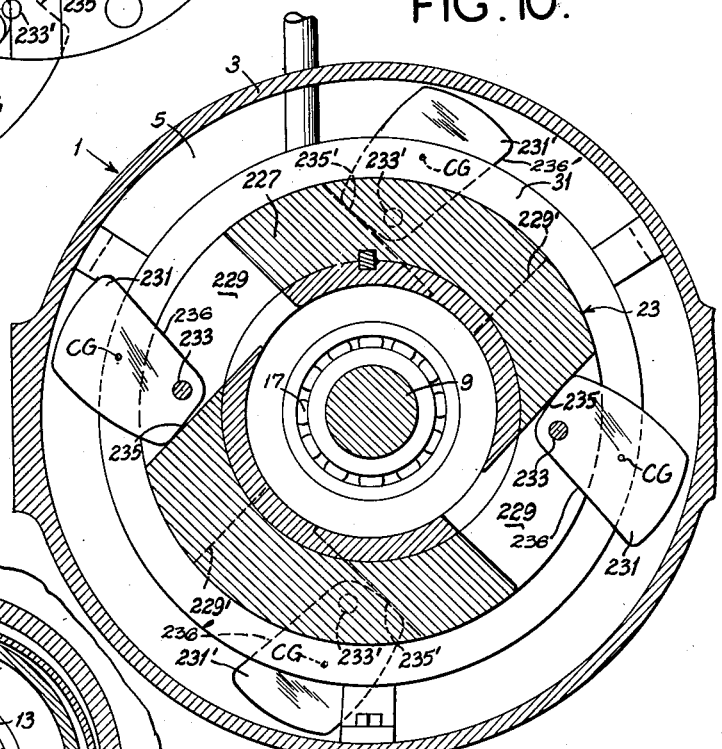
FIG. 4.
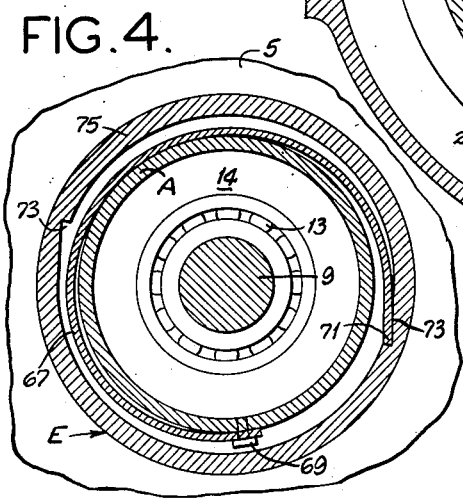
George E. Mallinckrodt
Inventor,
Koenig and Pope,
Attorneys.

May 19, 1953  G. E. MALLINCKRODT  2,638,880
ROTARY EXPANSION ENGINE
Filed Nov. 8, 1950  4 Sheets-Sheet 4
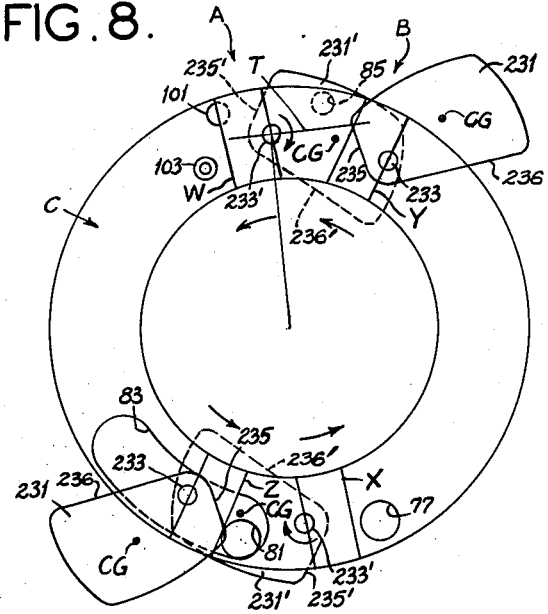
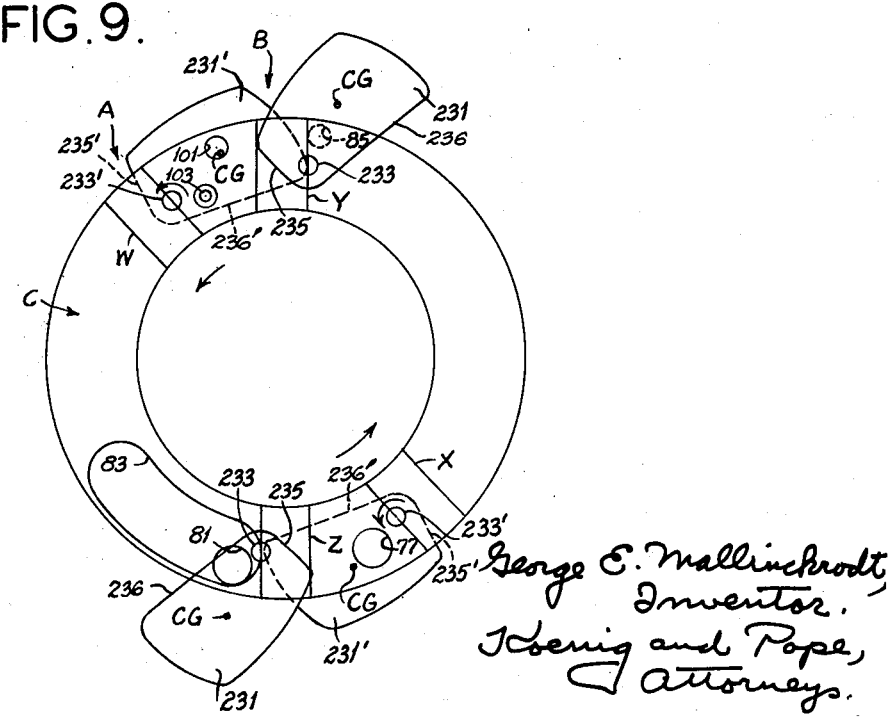

Patented May 19, 1953

2,638,880

UNITED STATES PATENT OFFICE 2,638,880

ROTARY EXPANSION ENGINE

George E. Mallinckrodt, St. Louis, Mo.

Application November 8, 1950, Serial No. 194,599

12 Claims. (Cl. 123—11)

This invention relates to rotary expansion engines capable of operating with expansive gaseous or vapor mediums such as hydrocarbon mixtures, air, steam, etc., and employing multiple rotors having opposed pistons alternately positioned in a toroidal cylinder. It is an improvement upon the construction disclosed in United States Patent 2,373,791, dated April 17, 1945, and upon the construction disclosed in my copending United States patent application Serial No. 183,846, filed September 8, 1950, for Rotary Expansion Engine.

Briefly, the invention consists in means for improving the performance of a rotary engine of the stated class by use of movable rotor weights which improve the mode of transfer of momentum from one rotor to another. Briefly, the movable weights are associated with the respective rotors of the machine and are so arranged that during a compression event sufficient velocity is conserved in each rotor so that it may positively reach a required locking position. This is accomplished by preventing transfer of all energy from one rotor as it advances upon the other during the compression event. The untransferred energy causes the one rotor to follow the other rotor sufficiently to reach the locking position, which position is beyond that which could be attained without the weights. Other improvements and advantages will appear below.

The invention comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is an external view of one form of the invention;

Fig. 4 is a cross section taken on line 4—4 of Fig. 2, illustrating one of two identical one-way or reverse locking clutches;

Figs. 7–9 are diagrammatic views of the pistons at various positions developed throughout a cycle of action beginning with the position shown in Fig. 2; and, Fig. 10 is a cross section taken on line 10—10 of Fig. 2.

Similar reference characters indicate corresponding parts throughout the several views of the drawings.

Figure 1:
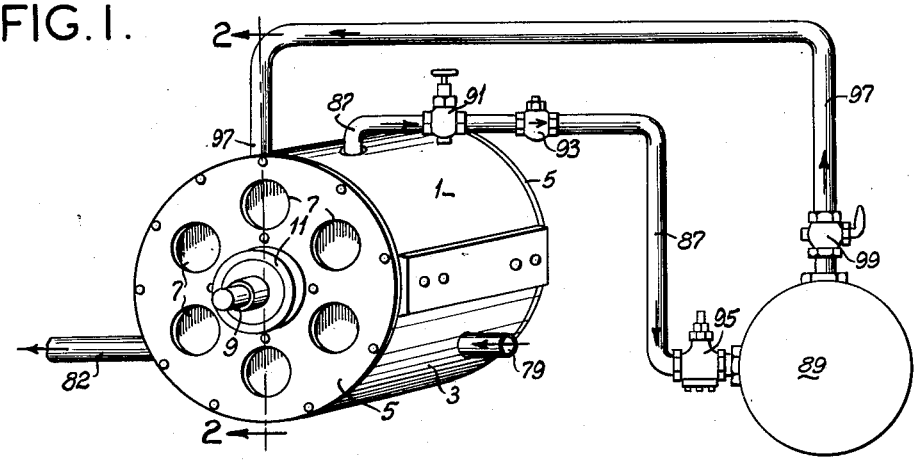

Referring now more particularly to Figs. 1-6 there is shown at numeral 1 a case or frame consisting of a drum 3 and end members 5, the latter containing air passages 7. The case 1 supports a rotary power shaft 9 in end bearings 11. Supported in a rotary manner is a rotor A around the left end of power shaft 9 and a rotor B around the right end of power shaft 9. Rotor A is carried upon bearings 13 within rings 14 and 15, both of which rings are attached within rotor A. Rotor B is carried upon bearings 17 within rings 18 and 19, both of which rings are attached within rotor B. Flywheels 21 and 23 are keyed to the rotors A and B, respectively.

Figure 5:
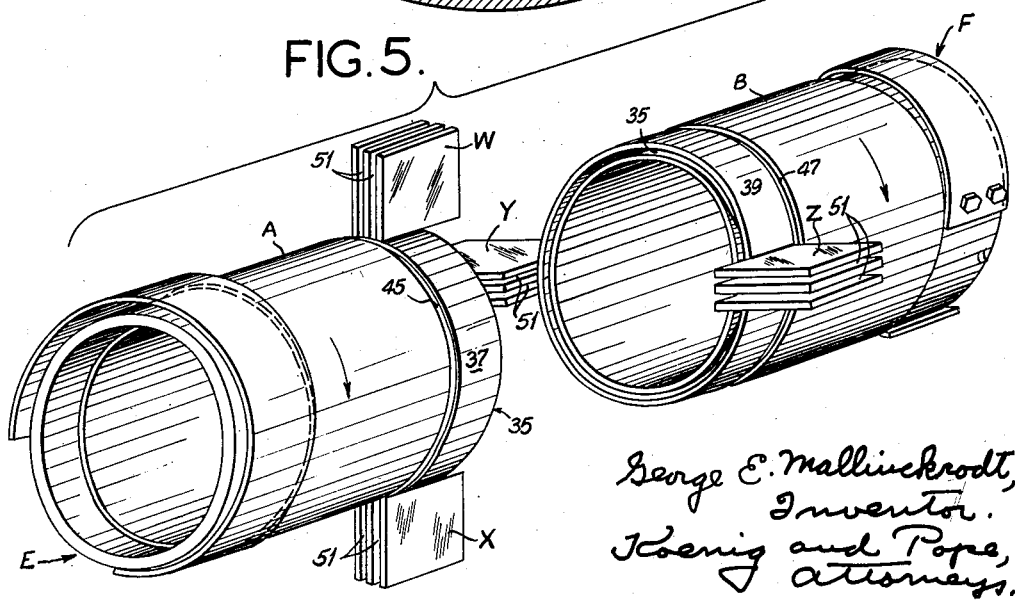
Fig. 5 is an exploded isometric view of two rotors removed from the engine.

Rotor A carries oppositely located plate-type pistons W and X; and rotor B carries oppositely located plate-type pistons Y and Z (see Fig. 5). The pistons W, X, Y and Z revolve in a toroidal cylinder C of rectangular cross section. This cylinder C is comprised by an outer sleeve 25 on the exterior of which are air-cooling fins 27. Water cooling may be used at this point if desired. Bolted to the sleeve 25 are end plates 29 and 31, through which extend the adjacent ends 37 and 39 of the rotors A and B. These adjacent rotor ends 37 and 39 form the inside surface of the cylinder C.

Figure 2:
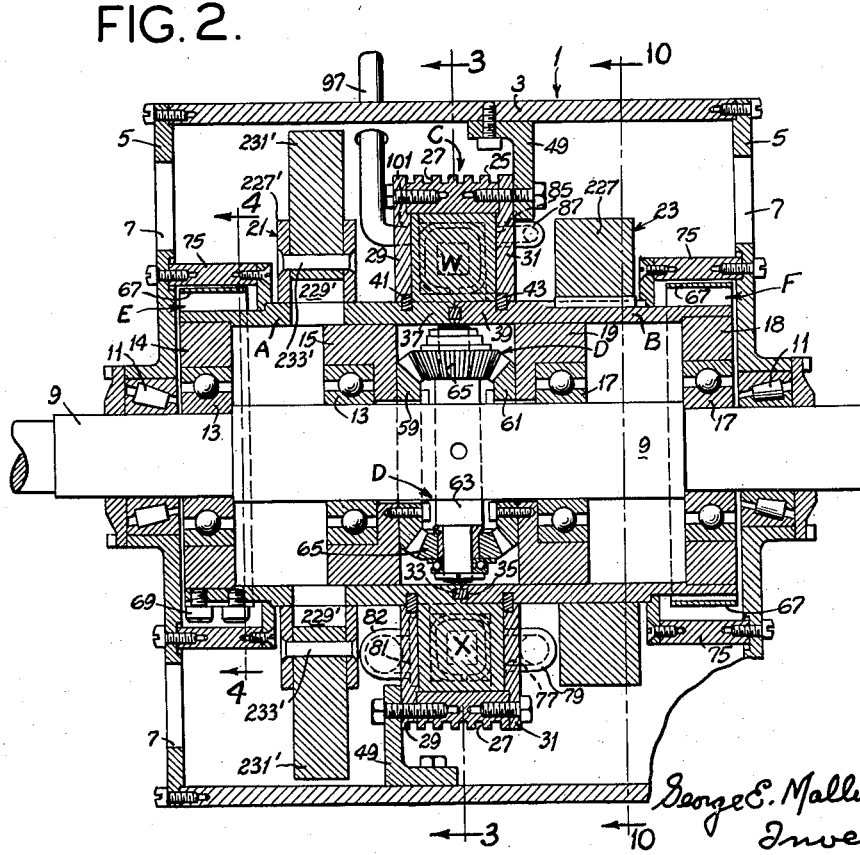
Fig. 2 is a longitudinal section taken on line 2—2 of Fig. 1.
Figure 6:
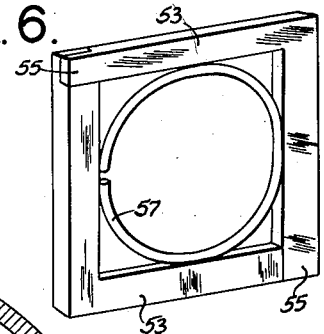
Fig. 6 is an isometric detail, on an enlarged scale, illustrating certain piston seals.

The rotors A and B move relatively and therefore an intermediate brass or like sealing ring 33 is employed in connection with abutting grooves 35. A sealing ring 41 is employed between rotor A and plate 29, and a sealing ring 43 is employed between rotor B and plate 31. The grooves for this purpose on rotors A and B are shown at 45 and 47, respectively, in Fig. 5. The assembly of parts 25, 29 and 31 of cylinder C is supported upon internal lugs 49 carried within the case 1. The pistons W and X extend from end 37 of rotor A over the end 39 of rotor B. The pistons Y and Z extend from end 39 of rotor B over the end 37 of rotor A. Thus the pistons W and X on the one hand, and Y and Z on the other hand, interdigitate alternately within the cylinder C to track one another in said cylinder under relative motions of the rotors A and B. In order to provide a gas- or vapor-tight seal between each piston and the walls of cylinder C, the pistons are grooved as shown at 51 for the reception of slidable L-shaped sealing members 53 (see Figs. 5 and 6). These members 53 are provided with sliding mortises 55 to allow separating movements under action of an internal expansion spring 57, one being employed for each pair of sealing members 53. One pair of members and a spring are carried in each groove 51. The sealing members are not shown in Fig. 5 but they are shown in Figs. 2 and 6.

A driving connection is afforded between both of the rotors A and B on the one hand, and the shaft 9 on the other hand, by means of differential gearing indicated generally at D. This gearing consists of a bevel gear 59 rigidly connected with rotor A by bolting to ring 15. It also has a bevel gear 61 rigidly connected with rotor B by bolting to ring 19. Inserted at right angles in shaft 9 is a pin 63 which carries rotary pinions 65, each of which meshes with gears 59 and 61. If rotor A is held stationary and rotor B advances, gear 59 will be stationary and gear 61 will be rotated with rotor B. The pinions 65 will then be rolled on gear 59 by gear 61 and will drive the shaft 9 at half the speed of the rotor B. On the other hand, if rotor B is stationary and rotor A advances, gear 61 will be stationary and gear 59 will be rotated with rotor A. The pinions 65 will be rolled on gear 61 by gear 59 and will drive the shaft 9 at half the speed of the rotor A.

The purpose of the differential gearing D is under such conditions to deliver an angular velocity to the shaft 9 which is the average of the angular velocities of rotors A and B. This angular velocity will be one-half of the maximum angular velocity of either rotor A or B when the other is stationary. When either rotor A or B decelerates, the other is accelerated (as will appear) but their average angular velocity will be delivered to shaft 9. The angular velocity of shaft 9 will be substantially constant when connected to a device having a substantial moment of inertia, such as an electrical generator, flywheel or the like.

While a bevel gear type of differential gearing is shown, it will be understood that equivalent differential gearing may be carried out with other than bevel gears, as for example, an all-spur gear differential.

In order to confine the movements of rotors A and B to one direction (counterclockwise; Figs. 3 and 7–9), each is provided with a reverse locking ratchet or clutch, the ratchet for rotor A being indicated in general at E, and the ratchet for rotor B being indicated in general at F. While any of various forms of ratchets or clutches may be used, each is herein shown as comprising (Fig. 4) a spiral spring band 67, anchored at 69 to its respective rotor A or B. Each band wraps around the rotor for a little over 270° to its end 71. Oppositely located notches 73 in the stationary sleeves 75 are engageable by the respective band ends 71. Two notches are in each sleeve 75 in the same angular positions, that is they are axially opposite one another. The notches in each sleeve are 180° apart. The long extent of the spiral springs 67, when lubricant is contained within the sleeve 75, renders their operation quiet, and the springs are made heavy enough to withstand the reactive forces during power operation. Cross reference is here made to my copending application Serial No. 325,083, filed December 10, 1952 for Ratchet, containing claims directed to the ratchet per se.

Figure 3:
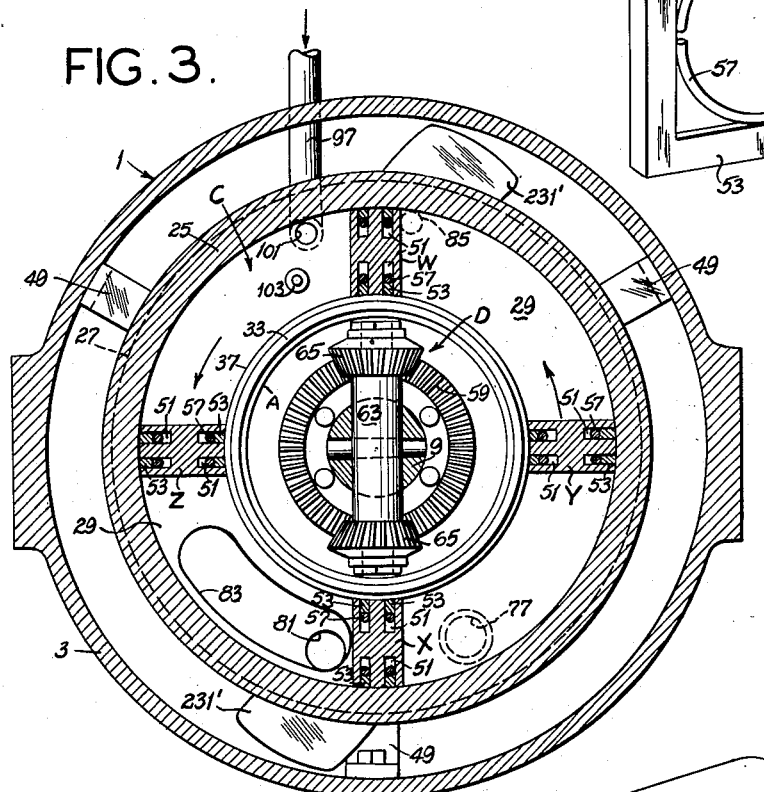
Fig. 3 is a cross section taken on line 3—3 of Fig. 2, showing certain piston mid positions.

Referring to Figs. 1–3, numeral 77 indicates a suction port having an inlet passage 79 leading from a carburetor, mixing valve or other fuel-preparing device (not shown, since any suitable carburetor or the like may be used for internal combustion operation with gasoline, alcohol or the like). The position of port 77 is shown by dotted lines in Fig. 3. It is actually in plate 31, which is ahead of the Fig. 3 section. At numeral 81 is shown an exhaust port with which is connected an arcuate pressure-release channel 83, sunk into the inner face of the ring 29. The exhaust port leads to an exhaust pipe 82.

At numeral 85 is shown a port in plate 31 which, through a pipe 87, connects with an air tank 89. The location of this port is also shown in dotted lines in Fig. 3. This pipe 87 includes a needle valve 91 for restricting the volume of flow to the tank 89, a check valve 93 opening toward the tank, and a pressure-relief valve 95 to limit the tank pressure. The tank has an outlet pipe 97 in which is a manual starting control valve 99. The pipe 97 connects with an air inlet port 101 in plate 29. The location of port 101 is also shown by dotted lines in Fig. 3. The purpose of this arrangement is to allow the machine to build up pressure in the tank 89 (through 85, 87, 91, 93 and 95) and to use this pressure for starting or running purposes at port 101, as will appear. Near the air inlet port 101 is an ignition plug 103 which is of the variety which maintains a constant igniting spark or temperature. For example, it may be a constantly arcing plug, a glow plug, or a so-called hot bulb, this plug at all times maintaining an igniting temperature.

The point of departure for the present invention from that shown in my said application Serial No. 183,846 relates to the flywheels 21 and 23. These in a simpler manner perform certain momentum transfer functions between the identical rotors A and B which were performed by an accumulator system described in said application. Since each flywheel and attached parts are identical to the other, it will be necessary to describe only one, the same reference characters for parts being used on each except that the parts for the flywheel 21 on rotor A will be primed. Thus the flywheel 23 for rotor B comprises a ring 227 keyed to the rotor B. The ring is slotted at two opposite points, as shown at 229. The slots extend partway into the supporting rotor. In each slot is a swinging weight 231, carried pivotally on a pin 233. As shown in Fig. 10, each weight 231 may swing from an inner position to an extended position, which has the effect of increasing the effective moment of inertia of the rotary parts with which the weights are connected, i. e., in this case the moment of inertia of the respective flywheel 23 and rotor B, including its pistons Y and Z. Each set of weights is preferably placed approximately in the plane of its rotor pistons but other positions are satisfactory in this respect. Each weight 231 is provided with a front surface 235 which upon forward swing engages the bottom of its slot 229. This limits its forward swinging movement relatively to its flywheel to a position in which the moment of inertia of its connected rotary system is a maximum. Each weight 231 also has a rear surface 236 which upon rearward swing engages the bottom of its slot 229. The terms forward and rearward are relative to the rotor movement.

The starting operation on air is as follows, assuming that the tank 89 is initially charged with pressure, the valve 99 has been opened, the piston Z has reached the point in its power stroke shown in Fig. 3, and piston W is reverse locked at the top by action of the reverse locking ratchet E:

Air flows through pipe 97 to port 101. This accelerates the piston Z, forcing it to its position shown in Fig. 3.

Piston Y is at this time receding from the inlet or suction port 77 and, being blocked off from exhaust port 81 by piston X, draws in a combustible charge. Any spent charge from a previous cycle of operation is pushed out of the exhaust 81 ahead of piston Z. The charge ahead of piston Y is compressed toward piston W. The locking of pistons W and X is performed by the expansive action of the charge between pistons W and Z, tending to push pistons W and X clockwise. However, pistons W and X are blocked by reason of clutch E being in the locked position shown in Fig. 4.

As piston Y approaches piston W, the intervening charge is compressed, a small amount being released through port 85 and needle valve 91 to maintain the pressure in tank 89. The needle valve 91 is adjusted to prevent a large amount of charge being used for this purpose. This action is illustrated in Fig. 7. The weights 231 and 231' are all out in the positions of parts shown in Fig. 7. In the case of rotor B, the weights 231 are out in this figure because this rotor has attained a substantial angular velocity which throws the weights out. In moving out they have gradually brought their surfaces 235 against the bottoms of seats 229, which act as stops. In the case of rotor A, as it comes to a stop, its weights 231' are out by reason of the fact that this rotor has decelerated from a maximum angular velocity in coming to its locked position. Thereafter these weights may move inward.

A short while after the Fig. 7 position, piston Z crosses port 83 and begins to release the working expansion pressure. This releases pistons W and X. The rotor B by this time has attained a substantial angular momentum (or kinetic energy). Upon release of pressure between pistons W and Z, this angular momentum (kinetic energy) is transferred from rotor B to rotor A (through the compressive charge between pistons W and Y). This is in the nature of a collision event acting through the interposed compressive charge, instead of by direct contact between pistons W and Y. Piston W then moves to the position shown in Fig. 8. At this moment, due to the acceleration of the rotor A carrying pistons W and X, the weights 231' rotate backward to their innermost positions. Thus the moment of inertia of the rotor A becomes smaller, whereas that of rotor B remains at its maximum due to its weights 231 being out, as shown in Fig. 8. Hence the moment of inertia of the parts connected with rotor A is smaller than that of the parts connected with rotor B, and the former cannot absorb all of the angular momentum of the latter. Since the latter (rotor B) cannot transfer all of its angular momentum to the rotor A, the rotor B will not be completely stopped and it will follow the rotor A until the piston Y assumes the locking position shown in Fig. 9. Without this feature the colliding piston Y could never assume the position of piston W collided with. Piston Y is then stopped and locked by expansion of the charge between pistons W and Y, ignition occurring at this time. Piston W then accelerates and weights 231' start to swing out again (Fig. 9). If the moments of inertia of both rotors were the same in the positions of parts shown in Fig. 8, the trailing rotor B could not assume the initially locked position of the rotor A, particularly under most efficient conditions of compression. This is because under such conditions the tendency would be for rotor B to transmit substantially all of its kinetic energy to rotor A, thus stopping rotor B before its reversed locking position is reached. But by means of this invention, during the compression event the trailing rotor has a moment of inertia relatively in excess of that of the leading rotor. Hence the leading rotor cannot accept all of this momentum and the trailing rotor with its remaining momentum will move ahead into the reverse locking position. It is to be observed that in identical positions of their weights the two rotors have equal moments of inertia, but that the one in which the weights are outermost at any instant has the relatively greater moment of inertia.

At the stage of events shown in Fig. 9, the piston W has uncovered the air inlet port 101 and a fresh charge of air is introduced and the cycle is repeated with rotors A and B interchanged in positions. At this time rotor B is locked against back rotation by clutch F. This state of affairs continues with the device operating essentially as an air engine, until the mixture introduced in port 77 reaches a concentration wherein under the cyclic action above described, the ignition plug 103 ignites the charges and then the air may be turned off at valve 99. The operation will then continue automatically, except that the charges between pistons as they cross the port 101 are explosive, and as these charges are brought over the plug 103, they explode with expansion action as already described.

In view of the above, it will be seen that the device will operate continuously either as an air engine if no carburetor is used on pipe 79, or as an internal combustion engine after air starting has been accomplished in the manner above indicated, assuming the carburetor to be attached to said pipe 79.

The invention may be epitomized in this, that each leading rotor when it leaves the locked position has its moment of inertia reduced automatically, due to the in-swinging of its weights under angular acceleration; whereas the other trailing rotor in approaching the locked position behind the leading rotor has had its angular momentum increased by reason of the outward positions of its weights reached in response to centrifugal forces occurring during maximum angular velocity. The outward positions are maintained during deceleration, which occurs until the reverse locking position is reached. The inward positions are attained upon acceleration from the locking position followed by a gradual outward movement as the velocity increases. It will be clear from the above that it is sufficient for carrying out the important features of the invention that the moment of inertia of the rotary system which advances toward collision shall be larger relative to the movement of inertia of the system which recedes therefrom.

The centers of gravity of all weights are indicated at CG. When a pair of weighs is inward, as is the case of weights 231' in Fig. 8, their centers of gravity are inside of a tangent T to the circular trajectory of the respective pivot pin 233. The reverse moment thus applied to the weights as they swing inward (under angular acceleration of their supporting flywheel) minimizes percussion with the bottoms of their containing slots. Percussion between surfaces 235 and the bottoms of the slots is minimized by reason of the gradual outward movements of the weights as their respective rotors accelerate. Moreover the center of gravity CG of each weight in the outward position is close to a line L passing through the rotor center and the pivot of the weight (see Fig. 7). This fact also tends to minimize percussion upon the outward swing of each weight.

The term "inertia mechanism" as used herein refers to any means by which the moment of inertia of each rotary system herein described is caused to be relatively greater than that of the other during the period that such system overtakes the other upon collision.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In a rotary engine a toroidal cylinder, relatively movable pistons in the cylinder successively passing in the same direction a predetermined reverse locking position prior to an expansion event, means responsive to expansion for successively reverse locking the pistons as they reach said position, each succeeding piston compressing a charge against a preceding piston when the latter is reverse locked, said compressed charge being adapted to move the reverse locked piston from said locking position after said expansion event has substantially progressed, relatively movable rotors carrying the respective pistons to and from the locking position, and centrifugal apparatus on each rotor responsive to rotor speed temporarily to increase the moment of inertia of the respective rotor and its connected parts over the moment of inertia of the other rotor and its connected parts, as a piston of the former approaches a reverse locking position.

2. Apparatus made according to claim 1, wherein each centrifugal apparatus is also responsive to its rotor acceleration to move inward to decrease the moment of inertia of its rotor as its piston proceeds from said reverse locking position.

3. In a rotary engine a frame, a rotary power shaft, a toroidal cylinder attached to said frame and surrounding a center line passing through said shaft, rotors surrounding said center line being relatively movable in a given direction, said rotors including pistons respectively attached to the rotors and positioned for relative movement in said cylinder, a reverse locking clutch means operative between each rotor and the frame, means connecting both rotors with the shaft adapted to drive the latter, apparatus connected with each rotor comprising a movable part responsive to a rotor deceleration temporarily to assume a position in said apparatus increasing the moment of inertia of the respective rotor as one of its pistons approaches a reverse locking position, said apparatus being adapted in response to acceleration of its respective rotor to move said part to another position reducing the moment of inertia of the rotor as said piston proceeds from said reverse locking position.

4. In a rotary engine a toroidal cylinder, relatively movable pairs of pistons in the cylinder successively passing a predetermined reverse locking position, means for successively reverse locking the pistons as they reach said position and for unlocking them thereafter, succeeding pistons compressing fresh charges against preceding pistons when reverse locked, said fresh charges subsequently moving the reverse locked pistons, rotors carrying the respective pairs of pistons, and at least one movable weight on each rotor adapted in response to relatively large angular velocity of the respective rotor to move forward through an arc from an inner position to an outer position so as temporarily to increase the moment of inertia of the respective rotor as one of its pistons approaches the reverse locking position.

5. Apparatus made according to claim 4, wherein each weight is adapted in response to angular acceleration of its respective rotor to move inward and backward to decrease the moment of inertia of its rotor as one of its pistons recedes from said reverse locking position.

6. Apparatus made according to claim 4, wherein each weight is pivoted, and wherein there are stops associated with the weights to limit their pivotal movements.

7. Apparatus made according to claim 6, wherein the center of gravity of each weight is arranged when the weight is inward to lie within a line tangent to the trajectory of its pivot.

8. Apparatus made according to claim 6, wherein the center of gravity of each weight is arranged to lie close to a line passing through its rotor center and the pivot of the weight when the weight is in its outer position, and wherein said center of gravity of each weight is arranged when the weight is inward to lie within a line tangent to the trajectory of its pivot.

9. A rotary piston engine comprising two cooperating rotary systems, pistons for effecting resilient compression events between them, wherein alternately one system advances upon the other to effect such an event and the other system recedes, an inertia mechanism on each system responsive to the occurrence of such an event, the mechanism being adapted momentarily to increase the moment of inertia of a system in response to its advance upon compression, said mechanism also being adapted to decrease the moment of inertia of a system in response to its recession from compression.

10. Rotary apparatus comprising at least two cooperating rotary systems, wherein alternately each system advances upon the other to effect a collision event, an inertia mechanism on each system responsive to the occurrence of the collision event to increase the moment of inertia of the system which advances toward the collision and to decrease the moment of inertia of the system which recedes therefrom.

11. Rotary apparatus comprising at least two cooperating rotary systems, wherein alternately each system advances upon the other to effect a collision event, an inertia mechanism on each system responsive to the occurrence of the collision event to increase the moment of inertia of the system which advances toward the collision and to decrease the moment of inertia of the system which recedes therefrom, and reverse locking means operative during the collision process adapted to prevent reverse movement of the advancing system.

12. Rotary apparatus comprising an assembly of at least two cooperating rotary systems, wherein alternately each system advances upon the other to effect a collision event, means forming part of the assembly operative during the occurrence of the collision event adapted alternately to make the moment of inertia of one system larger relative to the other as said one system advances toward the other and the other recedes therefrom, and reverse locking means operative during the collision process adapted to prevent reverse movement of the advancing system.

GEORGE E. MALLINCKRODT.

References Cited in the file of this patent

UNITED STATES PATENTS

| Number | Name | Date |
| --- | --- | --- |
| 1,904,892 | Trube | Apr. 18, 1933 |